Sept. 25, 1951     M. KATCHER     2,569,176
CHECK VALVE
Filed March 8, 1946
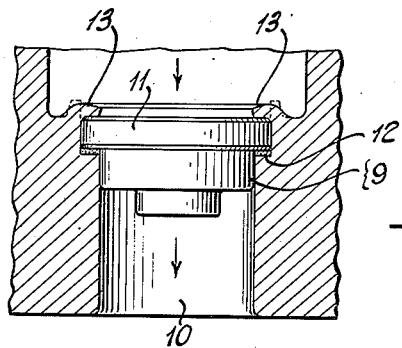
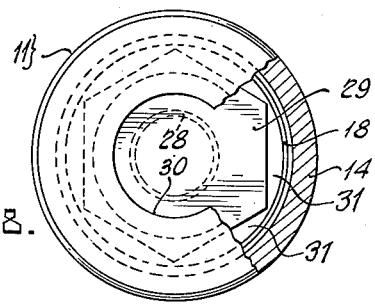
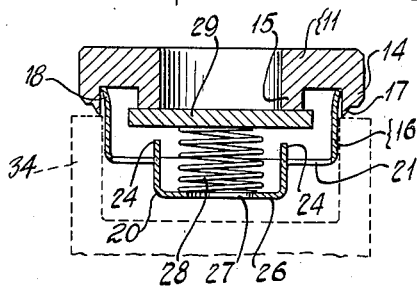
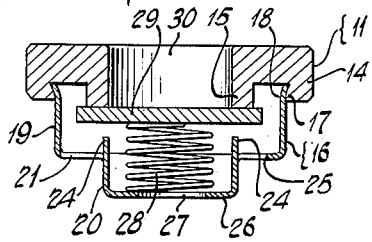
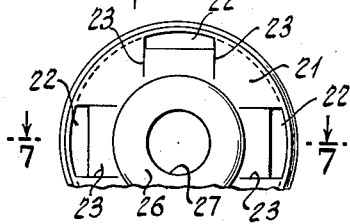
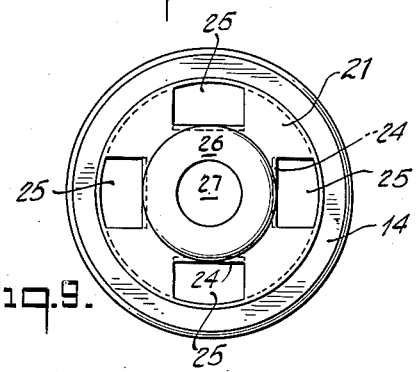
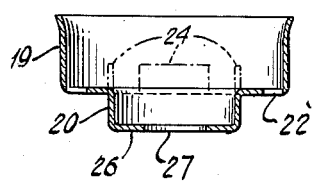
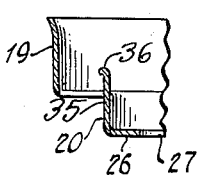
INVENTOR
*MORRIS KATCHER.*
BY
*Emanuel Scheyer*
ATTORNEY Patented Sept. 25, 1951

2,569,176

UNITED STATES PATENT OFFICE 2,569,176

CHECK VALVE

Morris Katcher, New York, N. Y.

Application March 8, 1946, Serial No. 652,858

2 Claims. (Cl. 251—144)

1

This invention relates to a check valve, especially one which is suitable for use in a fuel pump for internal combustion engines. In pumps of this type, it has been a practice to use valves which can be pushed into the passages of the pump and then held therein by clamping means or a forced fit. Valves of this type can be seen at 47 and 49 in Fig. 1 of Patent No. 2,036,452. A valve of this type forms the subject of my application Serial No. 509,645 filed November 10, 1943, which matured into Patent No. 2,430,427, on November 4, 1947. It is an object of the present invention to construct a valve in which the cage is of sheet metal and in which the ring, which fits into the passage of the pump, is a screw machine product. The ring is trough or channel-shaped. The trough is relatively deep so that a considerable length of the wall of the cage comes within the right in the trough. The cage itself is divided into two axially extending portions, the portion adjacent the ring being of considerably greater diameter than the portion farther removed from the ring. Joining these portions of different diameters is a substantially flat radially extending portion from which tongues are struck up to point in a direction toward the ring. These tongues serve to limit the motion of the valve flap away from its seat on the ring. The shape and construction of the cage with its tongues are such that the cage lends itself to the use of a durable die for producing it. In my preferred form, the tongues have a blunt or turned-over edge to lessen the wear on the flap when it strikes the tongues.

A further advantage of the construction is the provision of a triangular-shaped radially extending flange. The triangular shape of the flange permits it to be pressed over into a radial position against the cage without distorting the ring as a whole, the flange being originally axial as the ring is produced on the screw machine.

A further object of the invention is the provision of a flap or plate which has a scalloped edge, the scallops making for a freer passage of the liquid past the plate when the latter is unseated.

Other objects and advantages will become apparent upon further study of the description and drawing, in which Fig. 1 is an elevation of the valve shown gripped in the passage of a pump or the like.

Fig. 2 is a section, to a larger scale, through the valve shown before the flange on the ring has been swedged to grip the cage, the punch for the swedging being shown in dotted lines.

Fig. 3 is a top view of the valve with a portion of the ring broken away to show the flap and the cage.

Fig. 4 is a section taken similarly to Fig. 2 but shows the flange on the ring swedged into radial position to grip the cage.

Fig. 5 is a bottom view of the valve.

Fig. 6 is a partial bottom view of the cage, shown by itself, as initially punched and before the tongues have been struck up.

Fig. 7 is a section through the cage, shown by itself, as initially punched and before the tongues have been struck up, the struck up tongues being shown in dotted lines.

Fig. 8 is a plan view of a modified form of flap, shown by itself, having a scalloped edge, and Fig. 9 is a partial section of the cage, shown by itself, but with a modified form of tongues having a turned-over edge.

In the particular embodiment shown, a valve 9 is set in a passageway 10. Ring 11 of the valve is set in a recess of the passage on top of a gasket 12. Ring 11 is gripped at its upper edge by peened over lip 13.

Ring 11 is trough or channel-shaped with an outer rim 14 and an inner rim 15. The trough is relatively deep so that a considerable portion of the wall of cage 16 can be set inside of it. Ring 11, which is of relatively thick metal, is turned on a screw machine, while cage 16 is of relatively thin sheet metal and is stamped. Outer rim 14 is formed with a flange 17 which is triangular in cross section. The upper end 18 of cage 16 is curved radially outward. Cage 16 is formed of two main portions, an upper portion 19 and a lower portion 20 of considerably less diameter than portion 19. The two portions are joined by a radially extending part 21.

In order to fasten cage 16 in ring 11, a tool 34, shown in dotted lines in Fig. 2, is pushed against the apex of flange 17, causing the latter to bend radially inward as shown in Fig. 4. When flange 17 is so bent, it exerts pressure against cage 16, elastically deforming it. In final position, upper end 18 locks with inturned flange 17. A flange of the shape shown, lends itself to be readily swedged over against cage 16 without deformation of ring 11 elsewhere.

Cage 16 has its part 21 punched to produce holes or openings 22 and slits 23, tongues 24 being struck up from the metal freed by said openings and slits. When tongues 24 have been struck up, there is produced enlarged openings 25 in part 21, Fig. 5, which openings are of greater extent in a direction away from the tongues than the length of the tongues. This is due to the fact that opening 22 is added to the opening produced in striking up tongues 23, both of said openings adding up to opening 25. Tongues 24 are in substantial alignment with the wall of cage portion 20 and extend axially toward ring 11. Cage 16 has a transversely extending base 26 which is provided with an opening 27. A compression spring 28 extends between base 26 and flap or plate 29, normally holding the latter seated against inner rim 15 of ring 11, preventing flow of liquid out through opening 30. On the other hand, liquid flowing into ring 11, passes through opening 30 and forces flap 29 off its seat on rim 15 against the pressure of spring 28 allowing the liquid to flow into cage 16 and out its openings 25 and 27.

As shown in Fig. 3, flap 29 is polygonal in form, the corners of the polygon guiding the flap as it moves up and down by loose contact with the walls of the cage. The flat sides provide spaces 31 for the passage of liquid past the flap.

In Fig. 8 is shown a modified form of flap 32 whose edge is scalloped so as to provide larger spaces than spaces 31 for the freer passage of the liquid.

As an improvement over tongues 24 of Fig. 4, tongues 35 of Fig. 9 are provided with a blunted or turned-over edge 36. The recurring impact of plate 29 against the upper edge of tongues such as tongues 24, Fig. 4, tend to wear down the plate, but if the tongues be blunted, as tongues 35 in Fig. 8 such wear takes longer.

I claim:

1. A check valve comprising a ring, a sheet metal cage having a tight fit with the ring and extending axially away from one side of the ring only, said cage being divided into two axially extending portions, the portion adjacent the ring being of larger diameter than the portion farther removed from the ring, said cage having a radially extending part at its change in diameter joining said portions, tongues, of the metal of said part, extending axially from said part toward the ring in substantial alignment with the wall of the portion of smaller diameter, said part being open at the places furnishing the metal of the tongues, a transversely extending member movable within the larger diameter portion of the cage to seat against the ring, and a spring inside the cage normally holding the member in seated position against the ring, said tongues limiting the motion of the member away from the ring.

2. A check valve comprising a ring, a sheet metal cage having a tight fit with the ring and extending axially from the ring, said cage having two axially extending portions of which the portion adjacent the ring is of considerably larger diameter than the portion farther removed from the ring, said cage having a radially extending part at its change in diameter joining said portions, tongues integral with the cage extending axially from said part toward the ring, said tongues being substantially tangent to a circle whose center is on the longitudinal axis of the ring and whose diameter is the same as that of the portion of the cage farther removed from the ring, said part being provided with openings extending radially outward from the tongues, a transversely extending member movable within the larger diameter portion of the cage to seat against the ring, and a spring inside the cage normally holding the member in seated position against the ring, said tongues limiting the motion of the member away from the ring.

MORRIS KATCHER.

REFERENCES CITED

The following references are of record in the file of this patent:

UNITED STATES PATENTS

| Number | Name | Date |
| --- | --- | --- |
| 484,843 | Bavier | Oct. 25, 1892 |
| 517,914 | Bavier | Apr. 10, 1894 |
| 1,111,906 | Keppel | Sept. 29, 1914 |
| 2,348,548 | Koehler | May 4, 1944 |
| 2,430,427 | Katcher | Nov. 4, 1947 |

FOREIGN PATENTS

| Number | Country | Date |
| --- | --- | --- |
| 12,073 | Great Britain | June 9, 1905 |
| 20,740 | Great Britain | Oct. 13, 1905 |
| 695,492 | Germany | Aug. 26, 1940 |